J. H. HUDDLE.
LEVER ADJUSTMENT FOR WAGON BRAKES.
APPLICATION FILED APR. 18, 1908.
907,053.  Patented Dec. 15, 1908.
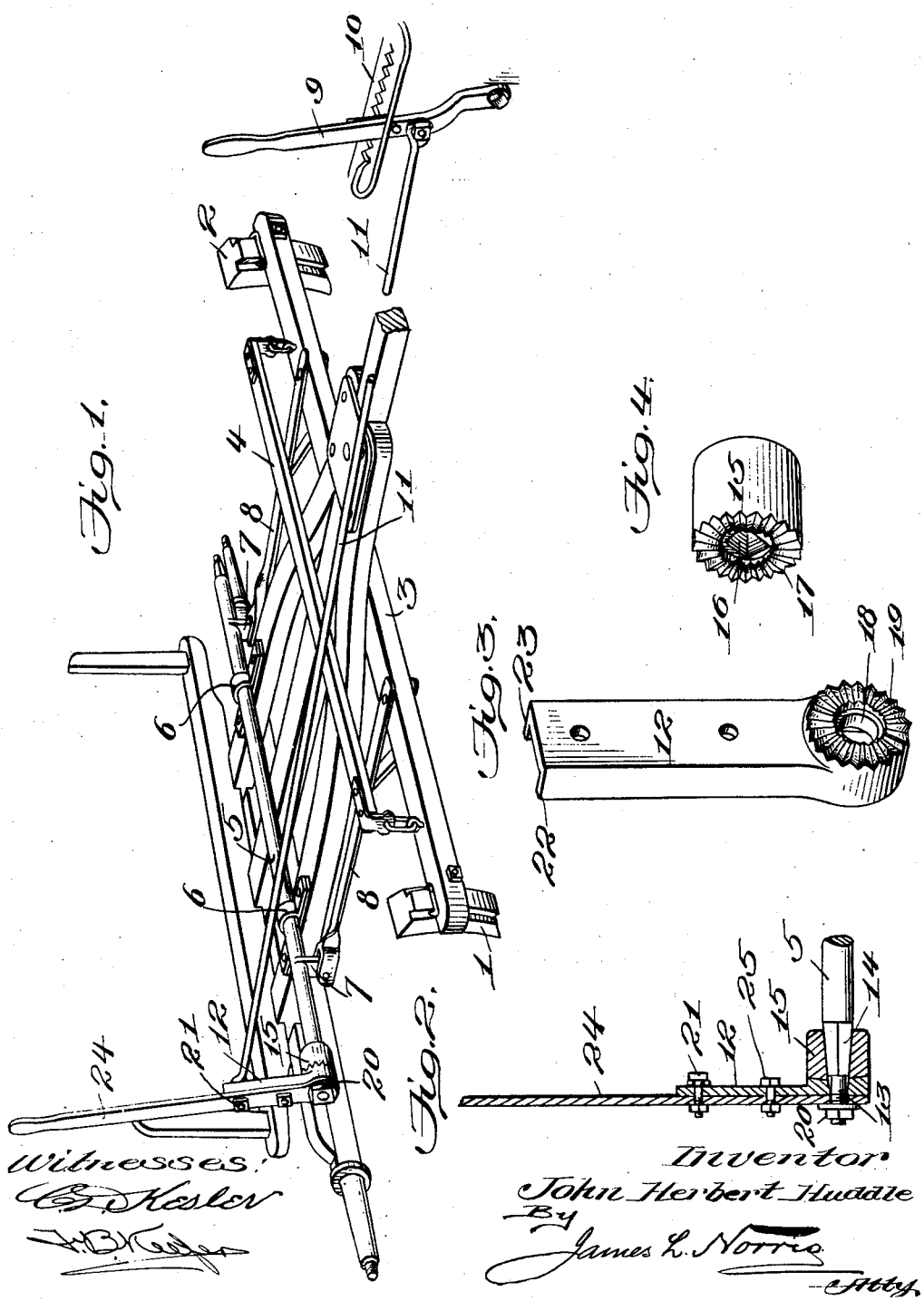
Witnesses:
Inventor
John Herbert Huddle
By James L. Norris
Atty.

UNITED STATES PATENT OFFICE.

JOHN HERBERT HUDDLE, OF EAST RADFORD, VIRGINIA.

LEVER ADJUSTMENT FOR WAGON-BRAKES.

No. 907,053.　　　　Specification of Letters Patent.　　　Patented Dec. 15, 1908.

Application filed April 13, 1908. Serial No. 427,881.

*To all whom it may concern:*

Be it known that I, JOHN HERBERT HUDDLE, a citizen of the United States, residing at East Radford, in the county of Montgomery and State of Virginia, have invented new and useful Improvements in Lever Adjustments for Wagon-Brakes, of which the following is a specification.

My present invention relates to improvements in lever adjustments for wagon brakes, and it has for its object primarily to provide a device which is adapted for attachment to the rotatable brake setting shaft whereby the lever which is attached to this shaft and operable by the usual rod and hand lever on the wagon body, may be adjusted at different angles with respect to the brake setting shaft in order that the lever may be maintained in an upright position or in such a position as to insure an efficient leverage on the brake shoes, irrespective of whether the shoes are considerably worn from use or whether new shoes have been fitted, the adjustment serving to compensate at all times for the variations in the thickness of the brake shoes.

Another object of the invention is to provide an adjustable lever of the character above set forth which is capable of being readily applied to the brake shafts on wagons of the various kinds now generally in use and also to provide for the convenient attachment of a relatively long handle to said lever whereby the brake may be easily operated after the body of the wagon carrying the usual front lever has been removed from the running gear.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 is a perspective view of a portion of the running gear of a wagon, the same being equipped with a lever adjustment constructed in accordance with my present invention; Fig. 2 represents a vertical section through the adjustable lever showing an extension handle attached thereto; Fig. 3 is a perspective view of the lever removed; and Fig. 4 is a similar view of the member which is fixed to the brake shaft and coöperates with the lever to lock the same in different angular positions.

Similar parts are designated by the same reference characters in the several views.

Lever adjustments embodying my present invention are capable of being applied generally to wagons of various kinds, and in the accompanying drawing, I have shown one embodiment of the invention which is capable of being applied directly to the brake shafts of wagons of a kind generally in use without requiring a modification of the brake mechanism thereof. It will be understood, of course, that the invention is capable of use in connection with all wagon brakes which use a rotatable shaft or equivalent part for setting the brake shoes against the wheels, the accompanying drawing showing a particular form of wagon as an example only.

In the present instance, the brake shoes 1 and 2 are fixed to the ends of a longitudinally movable brake beam 3, the latter being suspended by links from a cross-arm 4 attached to the rear portion of the running gear. The brake beam and the brake shoes thereon are set against the wheels by means of a brake shaft 5, the latter being rotatable in bearings 6 mounted on the running gear and is provided with a pair of cranks 7 which are connected to the brake beam by means of the tension rods 8, rotation of the shaft in one direction serving to set the brake shoes against the wheels and a reverse rotation of said shaft serving to relieve the pressure of the shoes against the wheels.

The brake shaft may be operated when the body of the wagon is in position upon the running gear by means of a forward handle or lever 9 which may be of the usual construction, these levers being usually provided with a locking rack 10 and are connected by means of a longitudinal rod 11 to the rear lever which is attached to the brake shaft.

The rear lever 12, according to my present invention, is so attached to the brake shaft that it may be adjusted and locked in different angular positions with respect thereto whereby this rear lever may stand in an upright position or in a position substantially perpendicular to the longitudinal rod 11 when the brake shoes engage the wheels for the reason that when this rear lever occupies such a position, the maximum leverage is obtained upon the brake shaft. In the present instance, the brake shaft has one or both ends provided with a reduced threaded stem 13, and beyond this threaded stem is formed a square or other angularly shaped portion 14 which tapers from the full diameter of the brake shaft down to the reduced threaded stem; in other words, this angular portion is tapered axially of the shaft, the reduced end of the tapered portion forming a continuation of the reduced threaded stem portion of the shaft. A locking member 15 which in the present instance is in the form of a sleeve is fitted over an end of the brake shaft, this member or sleeve having an angularly tapered aperture 16 which snugly fits the correspondingly shaped angular portion 14 on the end of the shaft. The outer face of this locking member or sleeve is provided with a series of radial ribs or teeth 17, the sides of these ribs or teeth being preferably inclined at divergent angles so as to approximate the form of ratchet teeth. The lever 12 is preferably formed with a round aperture 18 which fits loosely over the reduced threaded stem 13 on the brake shaft, and the inner face of this lever is provided with a set of radially arranged ribs or teeth 19 which form a counterpart and coöperate with the locking face of the member 15. A nut 20 fits upon the threaded stem 13 of the shaft and engages the outer side of the lever 12, tightening of this nut serving to firmly clamp the lever against the member 15 and the coöperating radial ribs or teeth formed respectively on the lever and the member 15 form a positive driving connection between the lever and the brake shaft. The longitudinal brake operating rod 11 may be attached at its rear end to the rear lever 12 in any suitable manner, a bolt 21 extending through the upper portion of the lever in the present instance and coöperating with an eye formed at the rear end of the longitudinal rod. It will be understood, however, that any appropriate connection may be employed between the rod 11 and the rear brake lever.

In applying and using a brake rigging embodying a lever adjustment constructed in accordance with my present invention, the rear brake lever 12, in order to secure the maximum leverage on the brake shaft, is set in such an angular position with respect to this shaft that it will occupy an upright or vertical position, or a position perpendicular to the longitudinal rod 11 when the brake shoes are in engagement with the wheels. This adjustment may be made by rotating the lever 12 on the shaft 5 while the nut 20 is loosened or removed so that the ribs or teeth on the lever and the coöperating member or sleeve 15 may pass one another, the lever being brought into an upright or vertical position while the brake shoes are in engagement with the wheels. After the lever has been properly adjusted, the nut 20 is tightened, thereby clamping the ribs or teeth at the inner side of the lever firmly into locking engagement with the corresponding ribs or teeth on the member or sleeve 15, and as the latter is keyed to the brake shaft by means of the tapered angular portion on the shaft engaging a correspondingly shaped socket or aperture in the sleeve, a positive driving connection is formed between the lever and the shaft, and shifting of the lever around the shaft under the braking strain is prevented. As the shoes of the wagon become worn and consequently comparatively thin, it may be neccessary from time to time to unlock the adjustable lever and alter its angular position with respect to the brake shaft, and in fitting new shoes to the wagon, a similar adjustment may be made to compensate for the increased thickness of the shoes by unlocking the lever and re-adjusting it in a different angular direction with respect to the brake shaft.

Frequently, the body of the wagon is removed or omitted, in which case the usual forward hand lever and the longitudinal brake rod cannot be used for operating the brake. In those cases, it is preferable to fit a handle or extension upon the rear brake lever whereby this rear lever may be operated from any part of the running gear, and in some cases the wagon is so loaded that the usual hand lever, while it may be in position upon the running gear, is inaccessible for operation. In those cases, the elongated handle attached to the rear brake lever may be conveniently reached for operation from the top of the load. In order to adapt the rear brake lever for the reception of such a handle, it is preferably formed with a pair of vertical or longitudinal flanges 22 and 23 which form a groove between them to receive the lower end of a handle 24 which may be of any suitable or appropriate length. This handle preferably extends to the bottom of the lever and has an aperture through which the threaded portion 13 of the brake shaft extends, the nut 20 in that case being clamped against the lower end of the extension handle. The bolt 21 may also extend through an aperture in the handle, and if desired, a supplemental bolt 25 may extend through the lever and handle, it being possible to readily apply a handle to the rear brake lever when necessary, and when the wagon body has been replaced or the usual forward lever is accessible, this extension handle may be readily detached.

A lever adjustment constructed in accordance with my present invention is simple in construction so that it may be cheaply made, and it is preferably so constructed that it may be directly attached to the end of the usual brake shaft by merely removing the old fixed lever and attaching the locking member and the adjustable lever thereto, and in practice, it enables the maximum leverage to be obtained upon the wagon brakes and also provides means for compensating for the wear or the replacing of the brake shoes.

I claim as my invention:—

1. A lever adjustment for wagon brakes comprising a brake shaft for operating the brake shoes, a lever for operating said shaft, and an interlocking clutch having coöperating members relatively adjustable axially of said shaft for positively locking said lever in different angular positions with respect to said shaft whereby the leverage of said lever may be maintained substantially constant with respect to said shoes and the operating shaft.

2. A lever adjustment for wagon brakes comprising a brake shaft for operating the shoes, a locking member non-rotatably fixed on the shaft and having a set of locking ribs or teeth formed on its outer face, an operating lever for said shaft having a set of locking ribs or teeth formed on its inner face and adapted to have a positive locking engagement with those on said member when said lever occupies different angular positions about the axis of said shaft, and a device movable axially of the shaft for clamping said lever in locking engagement with said member whereby said lever may be angularly adjusted relatively to said shaft according to the wear of said shoes.

3. A lever adjustment for wagon brakes comprising a shaft adapted to operate the shoes and having a reduced threaded end and an angular portion tapering toward said end, a locking member having an angular tapered socket to detachably fit said angular tapered portion of the shaft and provided on one face with a series of radial locking ribs, a lever for operating said shaft, the lever having an opening to rotatably fit said threaded end and provided on one face with a series of radial ribs to match and interlock with those on said locking member, and a nut coöperating with said threaded end of the shaft to clamp the lever in locking engagement with the locking member.

4. A brake mechanism for wagons comprising a shaft adapted to operate the shoes, a lever for operating said shaft, interlocking devices for positively connecting said shaft and lever including means operable axially of said shaft for locking the lever in different angular relations thereto, an extension handle coöperating with said lever, and a device adjustable axially of the shaft and coöperating with said handle and lever for securing the handle to said lever and for locking the lever in fixed adjusted relation to the shaft.

In testimony whereof I have hereunto set my hand in presence of two subscribing witnesses.

JOHN HERBERT HUDDLE.

Witnesses:
TAYLOR MARTIN,
S. B. HARNEY.